US010681012B2

(12) United States Patent
Subbarayan et al.

(10) Patent No.: US 10,681,012 B2
(45) Date of Patent: Jun. 9, 2020

(54) METHODS AND SYSTEMS FOR DEEP LEARNING BASED API TRAFFIC SECURITY

(71) Applicant: Ping Identity Corporation, Denver, CO (US)

(72) Inventors: Udayakumar Subbarayan, Bangalore (IN); Bernard Harguindeguy, Atherton, CA (US); Anoop Krishnan Gopalakrishnan, Bangalore (IN); Nagabhushana Angadi, Bengaluru (IN); Ashwani Kumar, Bengaluru (IN); Santosh Sahu, Bangalore (IN); Abdu Raheem Poonthiruthi, Bangalore (IN); Avinash Kumar Sahu, Bangalore (IN); Yasar Kundottil, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 89 days.

(21) Appl. No.: 15/793,671

(22) Filed: Oct. 25, 2017

(65) Prior Publication Data
US 2018/0115578 A1    Apr. 26, 2018

(30) Foreign Application Priority Data
Oct. 26, 2016   (IN) .............................. 201611036787

(51) Int. Cl.
*H04L 29/06*    (2006.01)
*G06F 21/55*    (2013.01)
(Continued)

(52) U.S. Cl.
CPC .......... *H04L 63/0281* (2013.01); *G06F 21/55* (2013.01); *G06F 21/554* (2013.01);
(Continued)

(58) Field of Classification Search
CPC .. H04L 63/0281; H04L 63/1425; G06N 20/00
See application file for complete search history.

(56) References Cited

U.S. PATENT DOCUMENTS 7,209,962 B2    4/2007    Boden
7,743,089 B2    6/2010    Putzolu
(Continued)

FOREIGN PATENT DOCUMENTS

WO    WO 2016/168368    10/2016

OTHER PUBLICATIONS

Office Action for U.S. Appl. No. 15/164,512, dated Jul. 6, 2018, 9 pages.
(Continued)

*Primary Examiner* — Michael Simitoski
*Assistant Examiner* — Tarek Elarabi

(57) ABSTRACT

The present invention relates to the field of networking and API/application security. In particular, the invention is directed towards methods, systems and computer program products for deep learning based API traffic analysis and network security. The invention provides an automated approach to threat and/or attack detection by machine learning based accumulation and/or interpretation of various API/application traffic patterns, identifying and mapping characteristics of normal traffic for each API, and thereafter identifying any deviations from the normal traffic parameter baselines, which deviations may be classified as anomalies or attacks.

24 Claims, 10 Drawing Sheets

(51) Int. Cl.
   *G06N 20/00* (2019.01)
   *G06F 21/62* (2013.01)

(52) U.S. Cl.
   CPC ......... *G06F 21/6281* (2013.01); *G06N 20/00* (2019.01); *H04L 63/02* (2013.01); *H04L 63/04* (2013.01); *H04L 63/0807* (2013.01); *H04L 63/0876* (2013.01); *H04L 63/1425* (2013.01); *H04L 63/1458* (2013.01); *H04L 63/1491* (2013.01)

(56) References Cited

U.S. PATENT DOCUMENTS

| | | |
|---|---|---|
| 8,339,959 B1 | 12/2012 | Moisand et al. |
| 8,892,665 B1 | 11/2014 | Rostami-Hesarsorkh et al. |
| 8,949,828 B2 | 2/2015 | Pafumi et al. |
| 8,973,088 B1 | 3/2015 | Leung et al. |
| 8,990,942 B2 | 3/2015 | Thakadu et al. |
| 9,307,017 B2 | 4/2016 | Wang et al. |
| 9,413,560 B2 | 8/2016 | Patil et al. |
| 9,516,053 B1* | 12/2016 | Muddu ................. G06F 16/254 |
| 9,537,756 B2 | 1/2017 | Bahadur et al. |
| 9,948,703 B2 | 4/2018 | Olivier et al. |
| 10,025,873 B2 | 7/2018 | Jackson et al. |
| 10,193,867 B2 | 1/2019 | Subbarayan et al. |
| 10,484,337 B2 | 11/2019 | Subbarayan et al. |
| 2001/0039586 A1 | 11/2001 | Primak et al. |
| 2002/0112189 A1 | 8/2002 | Syvanne et al. |
| 2003/0110172 A1 | 6/2003 | Selman et al. |
| 2005/0165902 A1 | 7/2005 | Hellenthal et al. |
| 2006/0159082 A1 | 7/2006 | Cook et al. |
| 2007/0165622 A1 | 7/2007 | O'Rourke et al. |
| 2007/0192506 A1 | 8/2007 | Gupta et al. |
| 2008/0016339 A1 | 1/2008 | Shukla |
| 2008/0263654 A1 | 10/2008 | Bahl et al. |
| 2008/0320582 A1 | 12/2008 | Chen et al. |
| 2009/0040926 A1 | 2/2009 | Li et al. |
| 2009/0067440 A1 | 3/2009 | Chadda et al. |
| 2009/0327459 A1 | 12/2009 | Yoo et al. |
| 2010/0333111 A1 | 12/2010 | Kothamasu et al. |
| 2011/0145842 A1 | 6/2011 | Tofighbakhsh et al. |
| 2012/0054131 A1 | 3/2012 | Williamson |
| 2012/0110603 A1 | 5/2012 | Kaneko et al. |
| 2012/0226820 A1 | 9/2012 | Li et al. |
| 2012/0233668 A1 | 9/2012 | Leafe et al. |
| 2012/0290511 A1* | 11/2012 | Frank ...................... G06F 3/013 706/12 |
| 2012/0304244 A1 | 11/2012 | Xie et al. |
| 2013/0044764 A1 | 2/2013 | Casado et al. |
| 2013/0205028 A1 | 8/2013 | Crockett et al. |
| 2014/0059226 A1 | 2/2014 | Messerli et al. |
| 2014/0237594 A1 | 8/2014 | Thakadu et al. |
| 2014/0258771 A1 | 9/2014 | Xie et al. |
| 2014/0337268 A1 | 11/2014 | Bhattacharya et al. |
| 2014/0362681 A1 | 12/2014 | Bahadur et al. |
| 2015/0026794 A1 | 1/2015 | Zuk et al. |
| 2015/0095887 A1 | 4/2015 | Bhattacharya |
| 2015/0188760 A1 | 7/2015 | Anumala et al. |
| 2015/0188808 A1 | 7/2015 | Ghanwani et al. |
| 2015/0229579 A1 | 8/2015 | Kosim-Satyaputra et al. |
| 2015/0234639 A1 | 8/2015 | Allsbrook |
| 2015/0319226 A1 | 11/2015 | Mahmood |
| 2016/0011732 A1 | 1/2016 | Yang |
| 2016/0065672 A1 | 3/2016 | Savage et al. |
| 2016/0092297 A1 | 3/2016 | Mazon et al. |
| 2016/0234168 A1 | 8/2016 | Leung et al. |
| 2016/0308721 A1 | 10/2016 | Dellisanti et al. |
| 2016/0308900 A1* | 10/2016 | Sadika .................. G06F 21/552 |
| 2016/0352588 A1 | 12/2016 | Subbarayan et al. |
| 2016/0352867 A1 | 12/2016 | Subbarayan et al. |
| 2016/0366155 A1 | 12/2016 | El-Moussa et al. |
| 2017/0012941 A1* | 1/2017 | Subbarayan ............ H04L 47/20 |
| 2018/0115523 A1* | 4/2018 | Subbarayan ............ G06F 21/55 |
| 2018/0278635 A1 | 9/2018 | Shin |
| 2018/0337891 A1 | 11/2018 | Subbarayan et al. |
| 2018/0337892 A1 | 11/2018 | Subbarayan et al. |
| 2018/0337893 A1 | 11/2018 | Subbarayan et al. |
| 2018/0337894 A1 | 11/2018 | Subbarayan et al. |
| 2019/0114417 A1 | 4/2019 | Subbarayan et al. |

OTHER PUBLICATIONS

Office Action for U.S. Appl. No. 15/164,555, dated Jan. 9, 2019, 19 pages.
Office Action for U.S. Appl. No. 15/164,587, dated Feb. 22, 2018, 17 pages.
Office Action for U.S. Appl. No. 16/050,958, dated Dec. 31, 2018, 7 pages.
Office Action for U.S. Appl. No. 16/050,996, dated Nov. 16, 2018, 6 pages.
Office Action for U.S. Appl. No. 16/051,026, dated Dec. 13, 2018, 6 pages.
Extended European Search Report for European Application No. 18200235.2, dated Feb. 11, 2019, 9 pages.
Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).
Office Action for U.S. Appl. No. 15/164,512, dated Feb. 28, 2019, 18 pages.
Office Action for U.S. Appl. No. 15/164,512, dated Aug. 15, 2019, 16 pages.
Office Action for U.S. Appl. No. 15/164,555, dated Oct. 24, 2019, 24 pages.
Office Action for U.S. Appl. No. 16/050,915, dated Sep. 6, 2019, 18 pages.
Office Action for U.S. Appl. No. 15/792,850, dated Aug. 8, 2019, 9 pages.
Office Action for U.S. Appl. No. 16/158,836, dated Nov. 18, 2019, 13 pages.
Hachinyan, O., "Detection of Malicious Software Based on Multiple Equations of API-call Sequences," Feb. 2017, IEEE, pp. 415-418.

* cited by examiner

US 10,681,012 B2

METHODS AND SYSTEMS FOR DEEP LEARNING BASED API TRAFFIC SECURITY

CROSS-REFERENCE TO RELATED APPLICATION

This application claims priority under 35 U.S.C. § 119 to Indian Patent Application No. 201611036787 filed Oct. 26, 2016, the contents of which are incorporated by reference herein.

FIELD

The present invention relates to the field of networking and API/application security. In particular, the invention is directed towards methods, systems and computer program products for deep learning based API traffic analysis and network security.

BACKGROUND

Existing state of art solutions relating to network security implements traffic monitoring based on information corresponding to lower level network layers—for example layers 2, 3 or 4 i.e. within the subnet (or MAC) stack, internet (or IP) stack and transport (or TCP/UDP) stack. These existing approaches are based on monitoring Ethernet frames and IP packets at the network level—and are effective in achieving network security between specific end network devices. Such solutions for API security have so far adopted a singular approach—focusing on one particular attack at a time using user entered policies, as well as a "one-size fits all" type approach, where network monitors search for one or more identified patterns of abnormal behaviour. Existing approaches fail to take into account that normal and abnormal patterns of behaviour can vary significantly based on the target API, and that traffic patterns that are considered entirely normal or benign in respect of one API may, if observed in connection with another API, be indicative of severe indicators of compromise. There is accordingly a need to implement machine based approaches to threat and/or attach detection keeping in mind (and appropriately accounting for) a plurality of different APIs and/or application traffic patterns.

SUMMARY

An objective of the present invention is to secure API/Application/Web servers/Message Queues, which may use different types of APIs. Another objective of the present invention concerns machine learning based API security. The objective of the implemented invention is to provide an automated approach to threat and/or attack detection by machine learning based accumulation and/or interpretation of various API/application traffic patterns, identifying and mapping characteristics of normal traffic for each API, and thereafter identifying any deviations from the normal traffic parameter baselines, which deviations may be classified as anomalies or attacks.

The invention present a network gateway configured for securing one or more APIs implemented on a server backend. The network gateway comprises a processor configured to (i) receive data identifying a first API from among a plurality of APIs, (ii) generate a first anomaly detection model based on parameter data extracted from traffic data corresponding to the first API, wherein (a) selection of parameter data for generating the first anomaly detection model is based on first API configuration information corresponding to the first API, and (b) the generated first anomaly detection model includes one or more traffic parameter baseline values defined based on traffic parameter data corresponding to network traffic that is compliant with a prescribed network security policy, (iii) analyze traffic parameter data corresponding to network traffic directed to the first API for identifying deviations between the analyzed traffic parameter data and the one or more traffic parameter baseline values include within the generated first anomaly detection model, and (iv) initiate a routing decision based on an output of said analysis of traffic parameter data.

In an embodiment, the network gateway may be configured such that responsive to identifying a deviation between the analyzed traffic parameter data and the one or more traffic parameter baseline values, the routing decision comprises discarding a client message directed to the first API without forwarding said client message to said first API.

The network gateway processor may be configured to (i) receive data identifying a second API from among the plurality of APIs, (ii) generate a second anomaly detection model based on parameter data extracted from traffic data corresponding to generated by the second API, wherein (a) selection of parameter data for generating the second anomaly detection model is based on second API configuration information corresponding to the second API, wherein said second API configuration information is different from the first API configuration information corresponding to the first API, and (b) the generated second anomaly detection model includes one or more traffic parameter baseline values defined based on traffic parameter data corresponding to network traffic that is compliant with a prescribed network security policy, and wherein at least one traffic parameter baseline value based on traffic parameter data included within the second anomaly detection model is different from at least one corresponding traffic parameter baseline value based on traffic parameter data included within the first anomaly detection model.

The network gateway processor may in an embodiment be configured to respond to an event trigger for identifying an event state associated with an API selected from among the first API and the second API, and wherein identifying said event state comprises (i) identifying one or more deviations between data extracted from traffic data corresponding to corresponding to the selected API and one or more traffic parameter baseline values defined by an anomaly detection model corresponding to the selected API, and (ii) selecting an event state from among a plurality of event states, based on the identified one or more deviations.

In an embodiment of the network gateway, the first anomaly detection model is one of a single dimensional model or a multi-dimensional model. The first anomaly detection model may be generated based on any one of one or more histogram techniques, one or more mixture models, or one or more Gaussian models.

In an embodiment, the second anomaly detection model may be one of a single dimensional model or a multi-dimensional model. The second anomaly detection model may be generated based on any one of one or more histogram techniques, one or more mixture models, or one or more Gaussian models.

In a particular embodiment of the network gateway (i) generation of the first anomaly detection model is additionally based on parameter data extracted from traffic data corresponding to a plurality of APIs, and (ii) analysis of traffic parameter data corresponding to network traffic directed to the any of said plurality of APIs comprises identifying deviations between the analyzed traffic parameter data and the one or more traffic parameter baseline values include within the generated first anomaly detection model.

The invention also provides another embodiment of a network gateway configured for securing one or more APIs implemented on a server backend. In this embodiment, the network gateway comprises a processor configured to (i) receive an event trigger for generation of a first anomaly detection model corresponding to a first API, (ii) identify one or more API parameters corresponding to the first API, (iii) parse an anomaly detection model database to identify a second anomaly detection model having API parameters that match the identified one or more API parameters corresponding to the first API, and (iv) responsive to identifying a second anomaly detection model having API parameters that match the identified one or more API parameters corresponding to the first API, generating the first anomaly detection model, wherein generation of the first anomaly detection model is based on the identified second anomaly detection model.

In an embodiment of this network gateway the API parameters may include any one or more of API type, API function, API class or API category.

The invention further provides a method for securing one or more APIs implemented on a server backend. The method comprises (i) receiving data identifying a first API from among a plurality of APIs, (ii) generating a first anomaly detection model based on parameter data extracted from traffic data corresponding to the first API, wherein (a) selection of parameter data for generating the first anomaly detection model is based on first API configuration information corresponding to the first API, and (b) the generated first anomaly detection model includes one or more traffic parameter baseline values defined based on traffic parameter data corresponding to network traffic that is compliant with a prescribed network security policy, (iii) analyzing traffic parameter data corresponding to network traffic directed to the first API for identifying deviations between the analyzed traffic parameter data and the one or more traffic parameter baseline values include within the generated first anomaly detection model, and (iv) initiating a routing decision based on an output of said analysis of traffic parameter data.

In an embodiment of the method, responsive to identifying a deviation between the analyzed traffic parameter data and the one or more traffic parameter baseline values, the routing decision comprises discarding a client message directed to the first API without forwarding said client message to said first API.

The method may further include the steps of (i) receiving data identifying a second API from among the plurality of APIs, and (ii) generating a second anomaly detection model based on parameter data extracted from traffic data corresponding to the second API, wherein (a) selection of parameter data for generating the second anomaly detection model is based on second API configuration information corresponding to the second API, wherein said second API configuration information is different from the first API configuration information corresponding to the first API, and (b) the generated second anomaly detection model includes one or more traffic parameter baseline values defined based on traffic parameter data corresponding to network traffic that is compliant with a prescribed network security policy, and wherein at least one traffic parameter baseline value based on traffic parameter data included within the second anomaly detection model is different from at least one corresponding traffic parameter baseline value based on traffic parameter data included within the first anomaly detection model.

The method may include the step of responding to an event trigger for identifying an event state associated with an API selected from among the first API and the second API, wherein identifying said event state comprises (i) identifying one or more deviations between data extracted from traffic data corresponding to corresponding to the selected API and one or more traffic parameter baseline values defined by an anomaly detection model corresponding to the selected API, and (ii) selecting an event state from among a plurality of event states, based on the identified one or more deviations.

In a method embodiment, the first anomaly detection model is one of a single dimensional model or a multi-dimensional model. The first anomaly detection model may be generated based on any one of one or more histogram techniques, one or more mixture models, or one or more Gaussian models.

In an embodiment, the second anomaly detection model is one of a single dimensional model or a multi-dimensional model. The second anomaly detection model is generated based on any one of one or more histogram techniques, one or more mixture models, or one or more Gaussian models.

In specific embodiment(s) of the method (i) generation of the first anomaly detection model is additionally based on parameter data extracted from traffic data corresponding to a plurality of APIs, and (ii) analysis of traffic parameter data corresponding to network traffic directed to the any of said plurality of APIs comprises identifying deviations between the analyzed traffic parameter data and the one or more traffic parameter baseline values include within the generated first anomaly detection model.

The invention also provides a further method for securing one or more APIs implemented on a server backend. This method comprises (i) receiving an event trigger for generation of a first anomaly detection model corresponding to a first API, (ii) identifying one or more API parameters corresponding to the first API, (iii) parsing an anomaly detection model database to identify a second anomaly detection model having API parameters that match the identified one or more API parameters corresponding to the first API, and (iv) responsive to identifying a second anomaly detection model having API parameters that match the identified one or more API parameters corresponding to the first API, generating the first anomaly detection model, wherein generation of the first anomaly detection model is based on the identified second anomaly detection model.

In an embodiment of the method, the API parameters may include any one or more of API type, API function, API class or API category.

The invention additionally provides computer program products for securing one or more APIs implemented on a server backend, comprising a non-transitory computer readable medium having a computer readable program code embodiment therein, the computer readable program code comprising instructions for implementing any of the method embodiments described in this specification.

BRIEF DESCRIPTION OF ACCOMPANYING DRAWINGS

Figure 10:
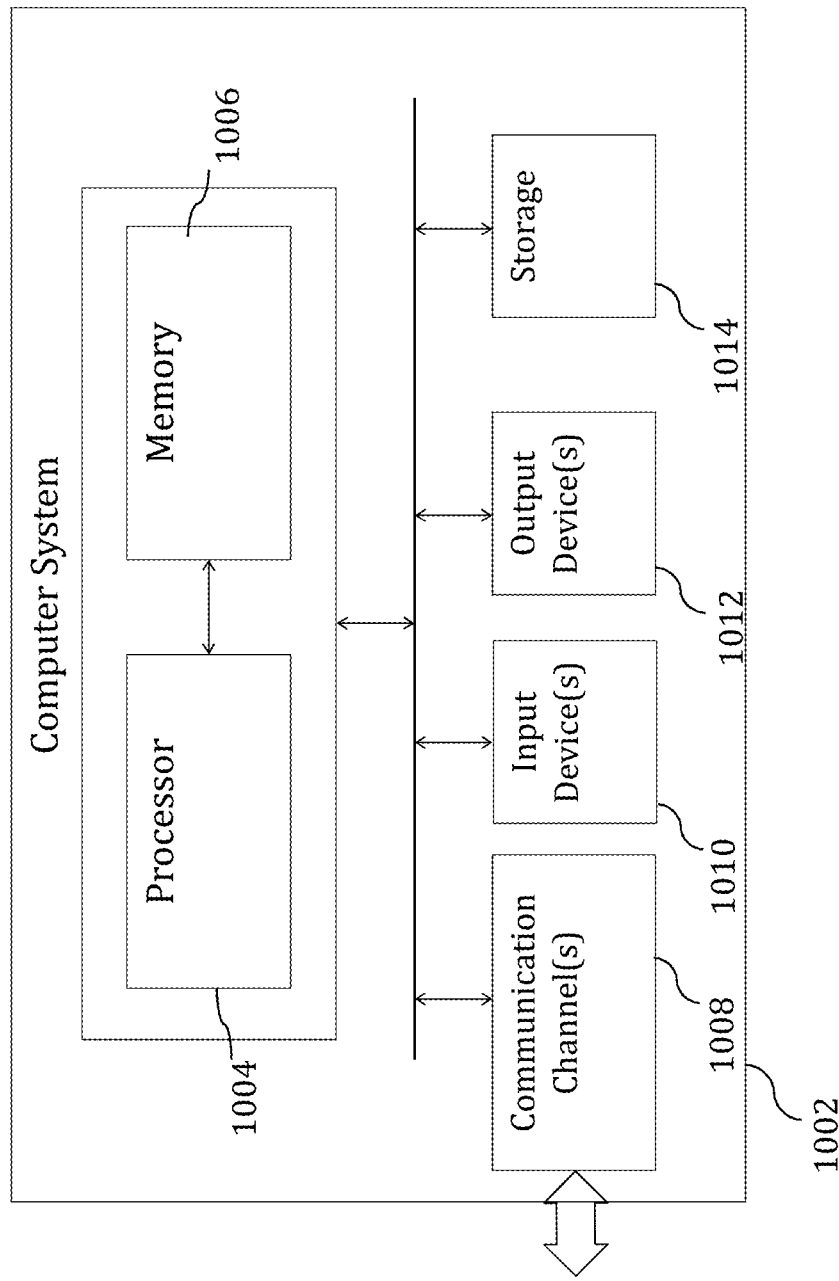

FIG. 10 illustrated an exemplary system in accordance with the present invention.

DETAILED DESCRIPTION

For the purposes of the invention "anomaly" shall mean any abnormal, unusual, unexpected or strange artifact, event or trend in API characteristics (for example, characteristics such as traffic volume, bandwidth use, protocol use etc.) that could potentially represent the presence of a threat, attack or indicator of compromise. Anomalies are identified in comparison with a baseline of normal network or user behavior that has been established over a period of time. Once certain parameters have been defined as normal, departures from normal parameters or ranges may be flagged as anomalous.

For the purposes of the present invention "API server" shall mean any server running at least one instance of at least one API of any type.

For the purposes of the invention "client" shall mean any device having information processing and network communication capabilities. The types of clients may vary widely and include but are not limited to desktop computers, laptop computers or notebook computers, personal digital assistants, handheld computers, cellular phones, servers and Internet of Things (IOT) sensors or servers, gateways, brokers, software bots ("bots") or other such devices.

For the purposes of the invention "indicator(s) of compromise" shall mean an artifact or event in network characteristics that indicate with high confidence, unauthorized access or attempts to access a system or data without appropriate authorization. Indicators of compromise are identified in comparison with a baseline of normal network or user behavior that has been established over a period of time. Once certain parameters have been defined as normal, departures from normal parameters or ranges may be flagged as indicators of compromise.

For the purposes of the present invention, "proxy" or "proxy node" shall mean any device having information processing and network communication capabilities that is configured to route communications from a client to a server and/or vice versa. The types of proxies may vary widely and include but are not limited to routers, load balancers, full proxies, half proxies, security proxies and IOT proxies.

For the purposes of the present invention, "proxy cluster" or "cluster of proxies" shall mean a plurality of proxies. For the purposes of the present invention, proxies within a proxy cluster may be understood as being interconnected in an overlay network.

For the purposes of the present invention, "server" shall mean any device having information processing and network communication capabilities, and which is configured to provide one or more services to a requesting client, over a communication network. The types of servers may vary widely, and include but are not limited to API servers, application servers, microservices, web servers, FTP servers, IOT brokers or gateways, message brokers, or service oriented architecture (SOA) servers.

For the purposes of the invention, "server backend" shall mean a set of one or more servers.

API based web applications, distributed applications and client server applications may use one or more security gateways (including servers, virtual machines and Linux containers) interposed between clients and servers for security at the API layer. Security gateways of the above type analyse incoming client requests or messages for indicators of compromise, before routing such client requests or messages to the target API or target API server.

Figure 1:
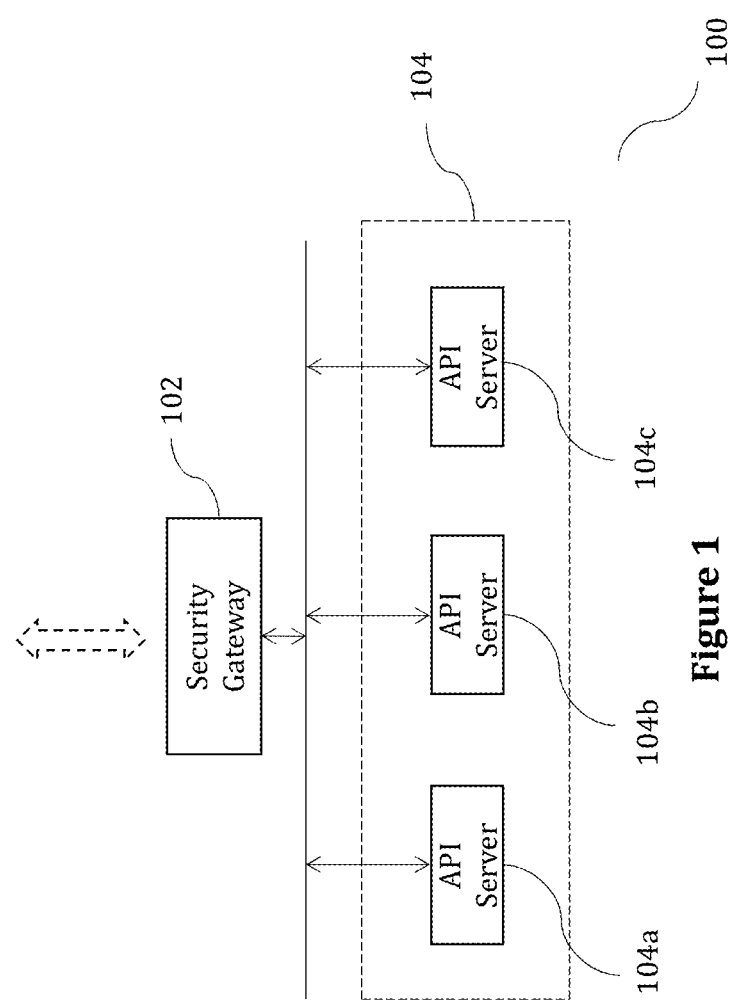
FIGS. 1 and 8 illustrate exemplary networking architectures comprising a security gateway or network proxies configured to implement API security, that are positioned to intercept and secure data communications to API servers and/or a server backend.

FIG. 1 illustrates a network architecture 100 comprising a security gateway 102 disposed as a network intermediate between clients (not specifically illustrated) and API servers 104 (104a, 104b and 104c).

Based on information retrieved from a DNS server or other name server, requests or messages from clients for services from server backend 104 are directed to security gateway 102. Subject to determining that the received request or message does not include any indicators of compromise, security gateway 102 transmits the received requests or messages to a target API server (104a to 104c) within server backend 104. Depending on the configuration of security gateway 102, responses from API servers 104a to 104c may first be received at security gateway 102 and thereafter redirected to a requesting client.

In implementing security gateway functionality, a gateway receives data packets addressed to a target service or server. The gateway transmits the data packets to an appropriate server based on predefined policies and techniques (e.g. security policies and techniques).

The present invention relies on innovative network architectures and proxy configurations to implement API level security in respect of the server backend.

The security gateway(s) of the present invention may be configured to identify anomalies, threats and/or attacks through implementation of deep learning based API traffic analysis.

Figure 2:
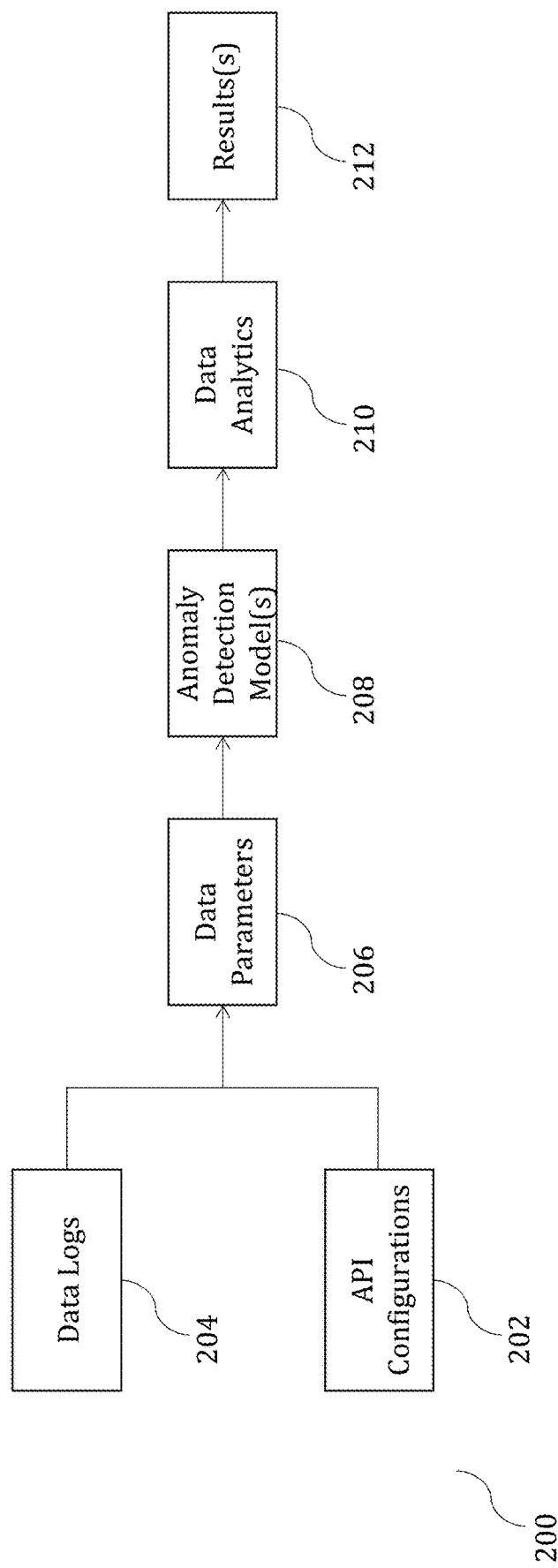
FIG. 2 is a process flow diagram illustrating a network security process in accordance with teachings of the present invention.

The invention achieves its objectives through the overall process flow 200 illustrated in FIG. 2. The illustrated process flow may be implemented by a processor implemented machine learning engine.

The process flow is initiated by parsing data from raw data logs 204 or from data packets corresponding to real-time API traffic that is being received, corresponding to data requests and data messages that have been forwarded to or received from one or more API servers or a server back end. Parsing of raw data logs 204 or data packets corresponding to real-time API traffic that is being received, comprises extracting data corresponding to a selected set of data parameters 208—which data parameters 208 are selected based on their relevance to identifying indicators of compromise corresponding to one or more APIs within a server backend. In an embodiment, data may be extracted from raw data logs or from data packets corresponding to real-time API traffic that is being received, using meta data formats such as (but not limited to) JSON, XML, text or binary format configurations. Yet further, discrete sets of data parameters 208 may be selected corresponding to each API that is being monitored by a security gateway. In other words, data parameters 208 that are selected for data extraction from raw data logs 204 or from data packets corresponding to real-time API traffic that is being received, may be different for different APIs.

The selection of data parameters 208 for extraction in connection with an API may in an embodiment be dependent on API configurations 202 and information corresponding to said API configurations—which API configurations 202 and information may be available on the security gateway or on any hosting system(s). It would therefore be understood that data parameters 208 selected in connection with an API having a first configuration may in an embodiment be different from the data parameters 208 selected in connection with an API having a second configuration—with the consequent result that data extracted from raw data logs 204 or from data packets corresponding to real-time API traffic that is being received, in connection with the two APIs would also be different.

The data corresponding to data parameters 206 that has been extracted from data logs 206 or from data packets corresponding to real-time API traffic that is being received, is used to develop one or more anomaly detection models 208, which anomaly detection models may be implemented to process application layer traffic information and identify deviations from normal or baseline traffic patterns as threats/anomalies/attacks and/or indicators of compromise. The anomaly detection models 208 may thereafter be used for machine implemented data analytics 201 for determining whether application layer traffic information deviates from normal or baseline traffic patterns sufficiently to establish a threat/attack/anomaly/indicator of compromise and output the results 212 of such determination.

It would be understood that for the purposes of the embodiment under discussion, where the raw log comprises one or more logs resulting from capture of API traffic data for REST API, WebSocket, MQTT, AMQP, CoAP and any other application layer (layer 7) protocols. The corresponding API configuration(s) (for example, a JSON configuration) includes associated meta data for each raw log. Various features associated with abnormal traffic detection are extracted at time intervals which could be anything from a fraction of a second all the way to an annual basis. Models are built using machine learning algorithms to output results for API visibility, API anomalies, API attacks, backend errors and blocked connections (e.g. connections that are blocked by an API security front-end proxy or security server. The aggregate summary and details of all blocked connections are reported on a per-API basis, for recording violations such as methods, content types, and protocol mismatch, and also for blocked attacks, etc.

Figure 3:
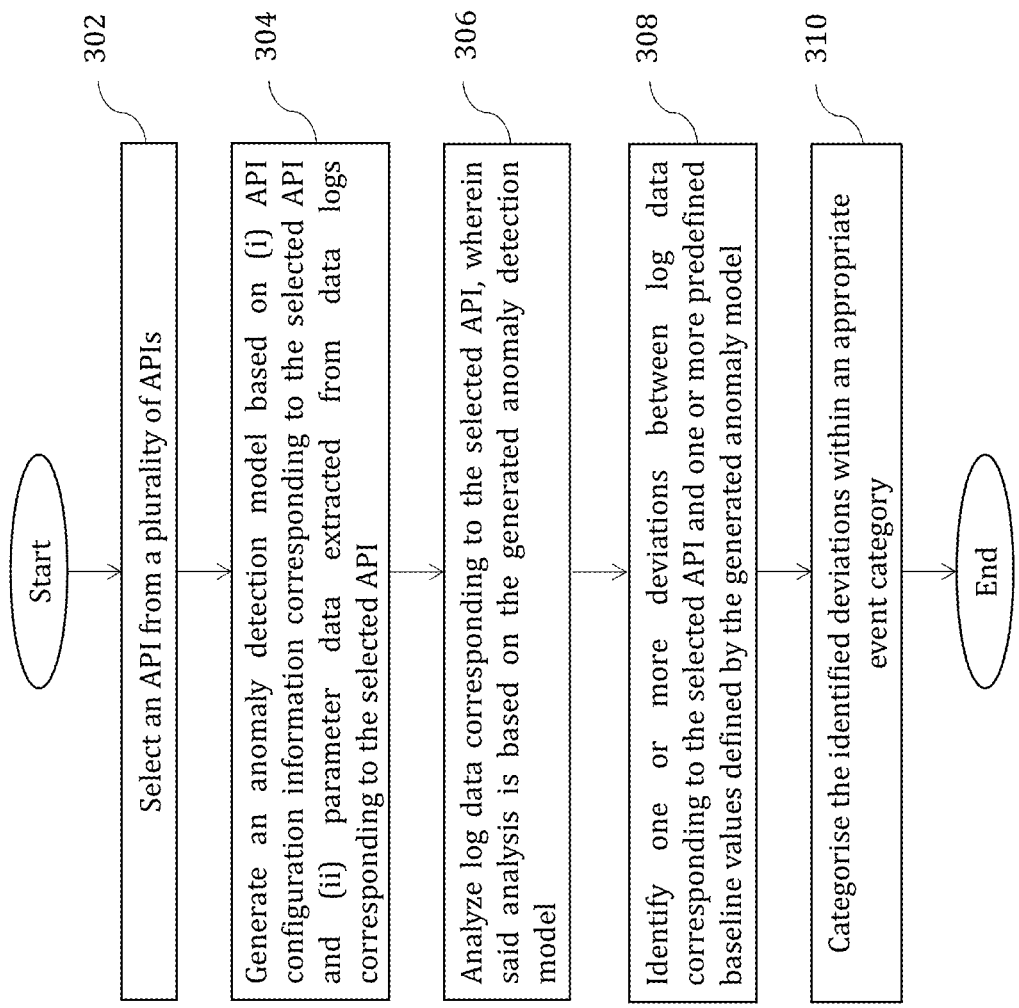
FIGS. 3, 4 and 7 illustrate methods for deep learning based API traffic security in accordance with teachings of the present invention.

FIG. 3 shows a flowchart, illustrating the principle method steps of implementing the process flow of FIG. 2.

Step 302 comprises selecting an API from among a plurality of APIs. In an embodiment, the plurality of APIs may comprise a plurality of APIs implemented on a server backend, and which are sought to be protected by a security gateway in accordance with the teachings of the present invention.

Step 304 comprises generating an anomaly detection model based on (i) API configuration information corresponding to the selected API and (ii) parameter data corresponding to the selected API that is extracted from data logs or from data packets corresponding to real-time API traffic that is being received, corresponding to the selected API. In an embodiment, the selection of parameter data for extraction from the data logs or from data packets corresponding to real-time API traffic that is being received, may be dependent on API configuration information corresponding to the selected API. In an embodiment of the invention, generation of the anomaly detection model may include identification of one or more predefined traffic parameter baseline values that are representative of normal, expected or baseline traffic patterns in connection with the selected API or that are representative of network traffic that is compliant with one or more defined network security policies. In certain embodiments, an anomaly detection model may be generated based on and corresponding to a plurality of APIs. In one such embodiment, the generated anomaly detection model may be based on (i) API configuration information corresponding to each of the plurality of APIs and (ii) parameter data corresponding to each of the plurality of APIs that is extracted from data logs or from data packets corresponding to real-time API traffic that is being received, corresponding to the selected API.

Step 306 comprises analysis of the extracted parameter data/log data/received real-time data corresponding to the selected API—wherein analysis of said log data/real-time data is based on the generated anomaly detection model.

Step 308 comprises identifying one or more deviations between extracted parameter data corresponding to the selected API and one or more predefined traffic parameter baseline values defined within the generated anomaly model.

Responsive to identification of one or more deviations at step 308, step 310 comprises categorizing the identified deviations within an appropriate event category. Examples of event categories may include normal traffic, abnormal traffic, threat, attack or indicator of compromise.

Figure 4:
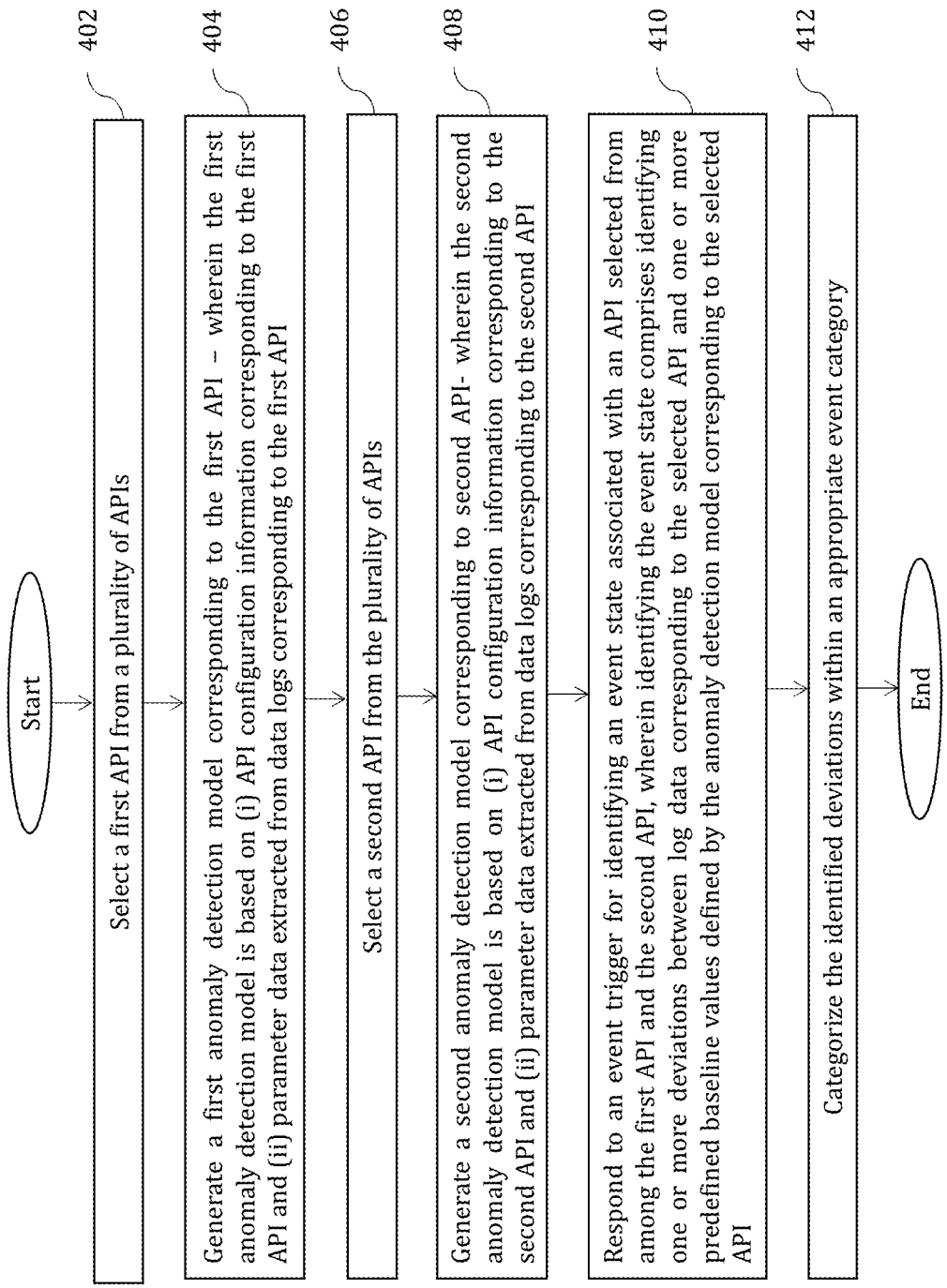

As discussed above, APIs having different API configurations may result in different anomaly detection models being generated in connection with each one. FIG. 4 illustrates a method that enables this.

Step 402 comprises selecting a first API from among a plurality of APIs. The plurality of APIs may comprise a plurality of APIs implemented on a server backend, and which are sought to be protected by a security gateway in accordance with the teachings of the present invention.

Step 404 comprises generating a first anomaly detection model based on (i) API configuration information corresponding to the first API and (ii) parameter data corresponding to the first API that is extracted from data logs/real-time data corresponding to the first API. In an embodiment, the selection of parameter data for extraction from the data logs/real time data may be dependent on API configuration information corresponding to the first API. In a specific embodiment of the invention, generation of the first anomaly detection model may include identification a first set of predefined traffic parameter baseline values (comprising at least one predefined traffic parameter baseline value) that are representative of normal, expected or baseline traffic patterns in connection with the first API.

Step 406 comprises selecting a second API from among a plurality of APIs. Step 408 comprises generating a second anomaly detection model based on (i) API configuration information corresponding to the first API and (ii) parameter data corresponding to the second API that is extracted from data logs/real-time data corresponding to the second API. In an embodiment, the selection of parameter data for extraction from the data logs/real-time data may be dependent on API configuration information corresponding to the second API. In a specific embodiment of the invention, generation of the second anomaly detection model may include identification of a second set of predefined traffic parameter baseline values (comprising at least one predefined traffic parameter baseline value) that are representative of normal, expected or baseline traffic patterns in connection with the second API. In an embodiment of the invention, the API configuration information corresponding to the second API is different from the API configuration information corresponding to the first API. In a further embodiment, the at least one traffic parameter baseline value within the first set of predefined traffic parameter baseline values is different from the a corresponding traffic parameter baseline value within the second set of predefined traffic parameter baseline values.

Step 410 comprises responding to an event trigger for identifying an event state associated with an API selected from among the first API and the second API—wherein identifying the event state comprises identifying one or more deviations between log data/real time data corresponding to the selected API and one or more predefined traffic parameter baseline values defined within the anomaly detection model corresponding to the selected API. It would be understood that the event trigger for initiating the analysis may comprise any event trigger, including any one of, receiving a data request or a data message, a periodic time based event trigger, or receiving a processor generated instruction for initiating the analysis at step 410.

Step 412 thereafter comprises categorizing any identified deviations within an appropriate event category. Examples of event categories may include normal traffic, abnormal traffic, threat, attack or indicator of compromise.

It would be understood from the teachings of FIG. 4 that owing to development of anomaly detection models corresponding to each API, a detected event may comprise a threat or indicator of compromise for a first API, while the same detected event would not comprise a threat or indicator of compromise for a second API. The invention accordingly enables for configurable and intelligent detection of indicators of compromise—where traffic parameter baseline values are determined or set based on identifying normal communication patterns corresponding to each API, so that a communication targeting a specific API is considered an indicator of compromise only if it is outside of the traffic parameter baseline values specific to that specific API.

In summary therefore, embodiments in accordance with the teachings of FIGS. 2 to 4 allow customers to establish traffic parameter baselines or anomaly detection models that are used to assess what is normal traffic for an API. These traffic parameter baselines could include any of the following data parameters, including but not limited to a score, a threshold, geolocation of the source of traffic, the datacenter of origin for that traffic, the device type used to access the API, the client machine used, the client machine environment and application used, or amount of traffic, payload type, protocol used, commands used, time of the day, different days in a week, holidays, vacations, different seasons in a year, impact of global events on the API, etc. These traffic parameter baselines may thereafter be used by machine learning algorithms to derive deep traffic intelligence for each API.

The methods discussed above may use one or a combination of data parameters for generating a single anomaly detection model or for establishing one or more traffic parameter baselines corresponding to said anomaly detection model—which may then be used to identify definitive normal traffic, definitive attack traffic/definitive threats and anomalies so that users can take actions based on the machine learning output.

Any traffic parameter baseline corresponding to an API or an anomaly detection model may be generated in accordance with the present invention, based on traffic parameter baselines aggregated from a number of customers across various clouds and datacenters. Capture and synthesis of traffic parameter baselines from different deployments could be automated and could use cloud based delivery to deliver them to customers either manually or automatically via one or more cloud connections or other forms of communication.

As a consequence of generating traffic parameter baselines/reference models based on raw logs/real-time received data of real API traffic data, the invention enables comparisons between traffic against a traffic parameter baseline or reference model that changes according to the time of the day, the day of the week, the specific vacation or holidays or religious holidays or national holidays etc. The traffic parameter baseline is learned, or configured or a combination of both, for each application/API. The traffic parameter baseline would change continuously as learned by the system or configured by the operator. The system implementing the present invention may then use a different traffic parameter baseline to analyze the traffic based on the time of the day, the day of week, holidays etc.

By way of example, the traffic parameter baseline used to detect abnormal/attack traffic may in an embodiment may be different at 1am from the one that would be used at noon, or the one used on a Saturday at noon would be different from the one used on a Monday at noon. This enables the detection of abnormal or attack traffic in a more accurate manner as an attack launched at 2 am on a Saturday will be compared to normal traffic at that time for that day of the year.

The invention also enables comparison between traffic against a traffic parameter baseline or reference model that changes according to the combination of one or more of the data parameters defined earlier such as the geolocation of the traffic source or the datacenter of origin for that traffic, the device type used to access the API, the client machine used, the client machine environment and application used, etc. For example, the traffic parameter baseline used to detect abnormal/attack traffic may in an embodiment be different at noon if it came from France from the one that would be used if it came at noon from Canada or from the one that came at noon from a datacenter located in New Jersey on a Saturday.

The predefined traffic parameter baseline(s) for each API may in an embodiment be made to change according to configuration—and for example, could be configured to change every fraction of a second, minutes, hours, day of the week, etc.

In an embodiment, the invention may also implement user adjustable traffic parameter baseline or reference models—wherein the traffic parameter baseline calculated or learned or injected during configuration could be adjusted up or down by the user (e.g. IT administrator or operator) in order to match the user's risk profile. A user that wants fewer false positive or false negative outcomes would be able to supply for each API or server, a number which could be, but is not limited to, a percentage, an integer, a fraction etc. which would automatically be used to adjust/calculate up or down the traffic parameter baseline used to analyze the traffic for that API or server. As the traffic parameter baseline changes based on the time of the day, the day, the week, a holiday etc., the correct automatically adjusted traffic parameter baseline may be used to analyze traffic.

The anomaly detection models discussed in connection with FIGS. 2 to 4 may in various embodiments comprise single dimensional models, multi-dimensional models, or mixture models.

Figure 5:
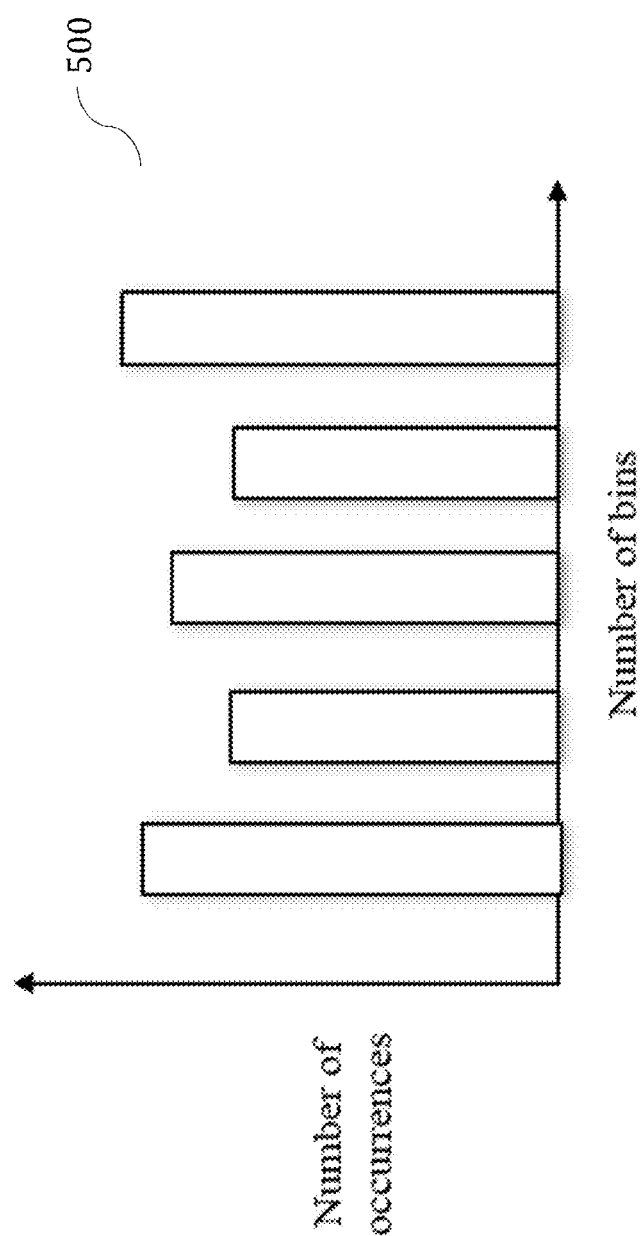
FIGS. 5 and 6 illustrate exemplary charts illustrating implementation of anomaly detection models in accordance with the present invention.

FIG. 5 illustrates a single dimensional model developed based on raw logs/real-time received data and API configurations. In an embodiment of the invention, the model may be developed using histogram techniques to identify at least one and preferably a plurality of data parameters from the raw logs/real-time received data and the API configurations retrieved from an API configuration repository. Individual histograms (or histogram based data structures) may be developed based on traffic to a specific API—and would thereafter provide usage details relating to traffic flow concerning said specific API. A plurality of individual histograms may in a specific embodiment be used as input to one or more mixture models to create multidimensional models for threat/attack/anomaly detection. In one embodiment, a single dimensional model may be developed based on raw logs/real-time received data and API configurations corresponding to a single API. In another embodiment, a single dimensional model may be developed based on raw logs/real-time received data and API configurations respectively corresponding to a plurality of APIs. Likewise, in one embodiment, a multidimensional model may be developed based on raw logs/real time received data and API configurations corresponding to a single API. In another embodiment, a multidimensional model may be developed based on raw logs/real-time received data and API configurations respectively corresponding to a plurality of APIs.

Single dimensional or multidimensional anomaly detection models may be generated using mixture models such as Gaussian models—based on inputs from the previously generated histograms. The generated anomaly detections models may comprise 1-dimensional, 2-dimensional or higher dimensional models.

Figure 6:
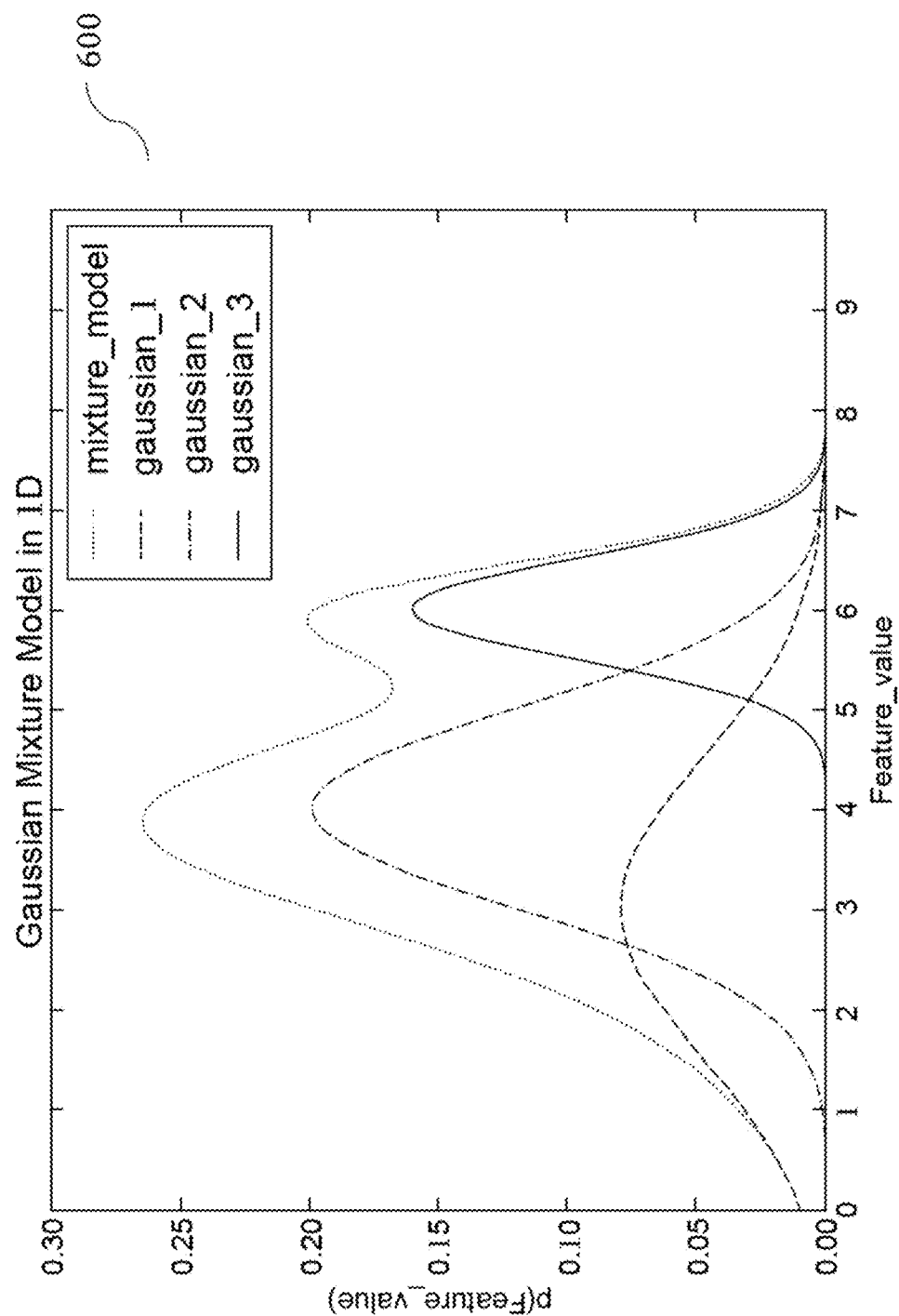

FIG. 6 illustrates an exemplary 1-dimensional anomaly detection model developed for detecting abnormal traffic directed at an API.

Based on the above, it would be understood that, anomaly detection models developed in accordance with the present invention enable identification of specific subsets of API traffic which comprise malicious traffic or anomalies, or threats, or attacks and indicators of compromise within the overall API traffic—using probability distribution based on data observations.

In an embodiment, the process flow of FIG. 2 may optionally include generation of an anomaly detection model dictionary. The anomaly detection model dictionary may comprise a database configured to retrievable store a plurality of anomaly detection models, wherein each anomaly detection model may be associated with any of an API, API type, API class or category, or one or more API characteristics. The anomaly detection model dictionary may thereafter be configured to enable users (e.g. IT administrators or operators) to identify an API and one or more of an API type, API class or category, or one or more API characteristics corresponding to an API and thereafter map the identified API to a selected anomaly detection model that is stored in the anomaly detection model dictionary, and which is associated with the identified API type, API class or category, or one or more API characteristics. In an embodiment, an anomaly detection model corresponding to the identified API may be generated based on the selected anomaly detection model from the anomaly detection model dictionary.

It would be understood that the above process enables automated and/or faster traffic parameter baseline establishment for each API—and consequently results in faster identification of abnormal traffic and attacks by using the combination of models which are specific to an API type, API class or category, or one or more API characteristics. The above described mapping allows the injection of a traffic parameter baseline immediately based on one or more identified API related parameters.

Categorization and association of an API with a pre-defined API class or category enables the invention to "inject" or configure a pre-defined traffic parameter baseline for that API during deployment to enable recognition of abnormal traffic for that API immediately after deployment. This eliminates the need for extensive time-consuming system training typically required to recognize abnormal traffic or attacks. For the purposes of explanation and without limitation, examples of pre-defined categories that can be used for categorization and association include API types such as a Login API or a Shopping Cart API.

In an embodiment, the invention contemplates generation of pre-defined API traffic parameter baselines for each category of API. Such pre-defined traffic parameter baselines, which represent normal traffic, may be created by observing historical traffic parameter baselines from one or more deployments which can then be categorized or organized according to an API type, vertical market, or other. The invention may thereafter create pre-defined baseline traffic, for example (i) for a Login API for a bank, or (ii) for a shopping cart API for a pharmacy. Vertical markets may include, but need not be limited to banks, ecommerce sites, hospitals, pharmacies, retailers, insurance, etc.

It would additionally be understood that predefined traffic parameter baselines may be supplied for a specific API category with or without the specifics of a vertical market or other form of categorization.

Figure 7:
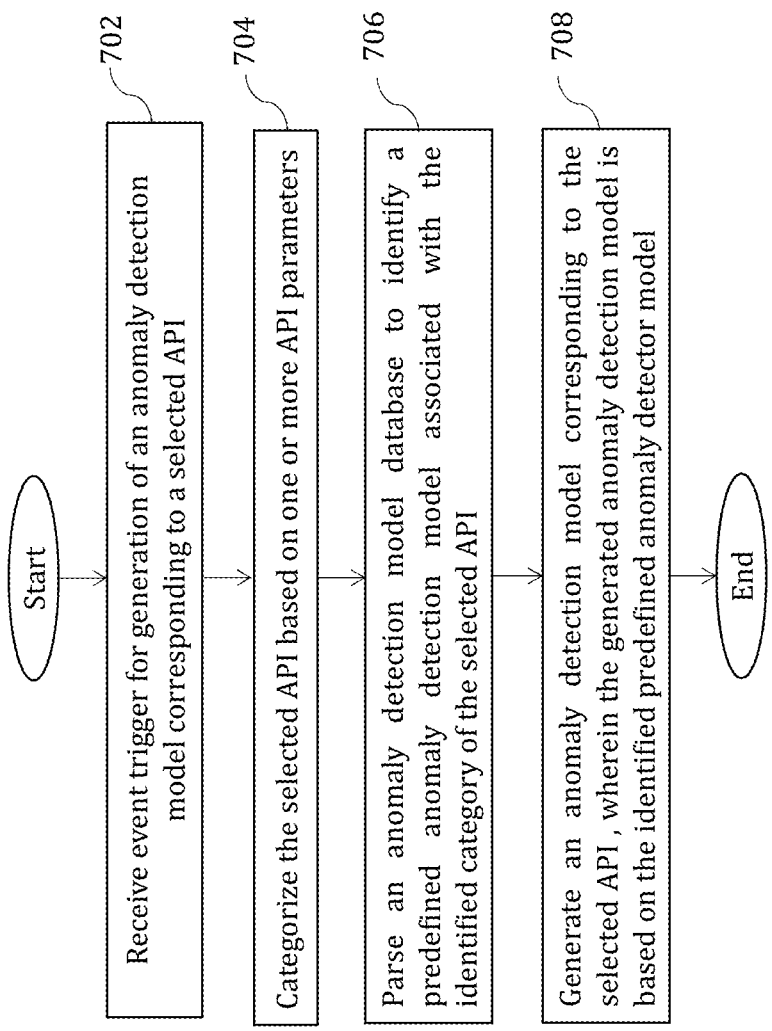

FIG. 7 illustrates an exemplary method that implements the above described teachings relating to an anomaly detection model dictionary.

Step 702 comprises receiving an event trigger for generation of an anomaly detection model corresponding to a selected API. It would be understood that the event trigger for initiating step 702 may comprise any event trigger, including any one of initiation or generation of a new API, or receiving a processor generated instruction for generating an anomaly detection model corresponding to a selected API.

Step 704 comprises categorizing the selected API based on one or more API parameters. Said categorization may in exemplary embodiments be carried out based on any of API type, API function, API class or category, or any other one or more API characteristics.

Step 706 comprises parsing an anomaly detection model dictionary/database to identify a predefined anomaly detection model associated with the identified category of the selected API. Step 708 thereafter comprises generating an anomaly detection model corresponding to the selected API, wherein the generated anomaly detection model is based on the anomaly detector model identified at step 706 and retrieved from the anomaly detection model dictionary/database.

Figure 8:
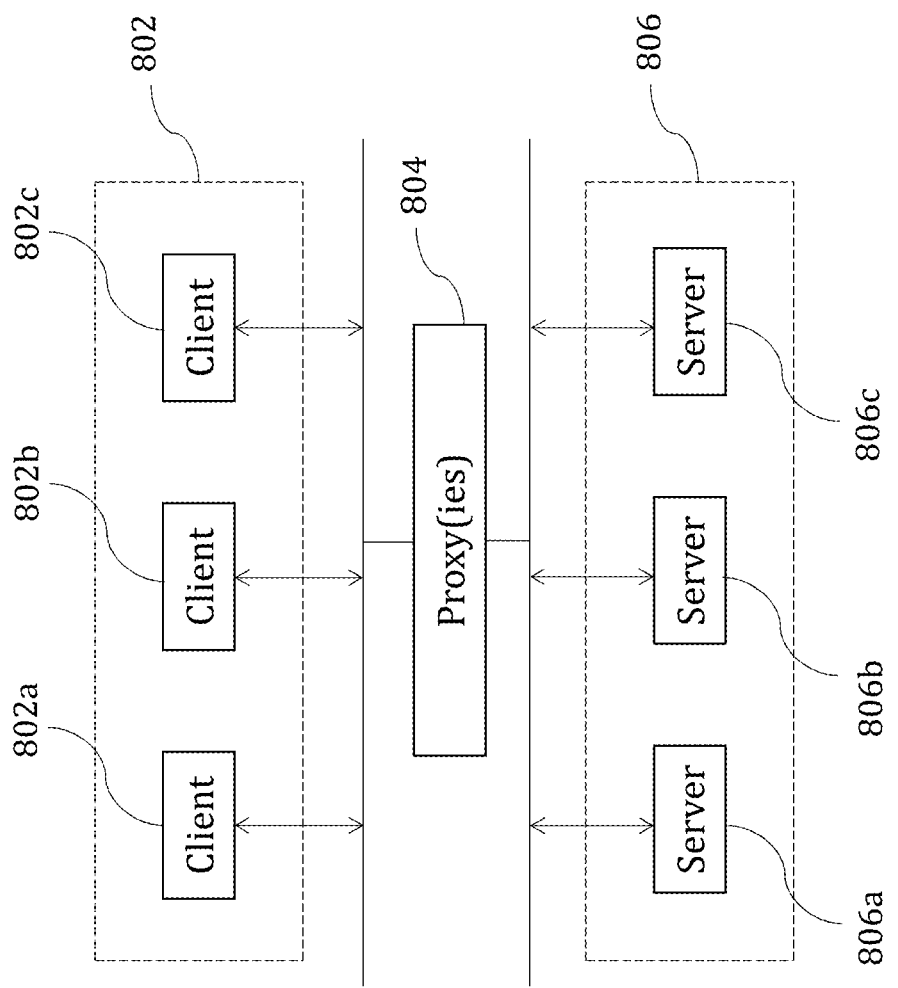

FIG. 8 illustrates a general embodiment of the invention wherein systems or methods in accordance with the teachings of the present invention may be implemented using API traffic data collected at one or more network proxies 804 that may be implemented as network intermediaries between clients 802 (802*a*, 802*b*, 802*c*) and a server backend 806 which may include one or more servers 806*a*, 806*b*, 806*c*. In an embodiment, said one or more proxies 804 may fall within one or more proxy clusters, including optionally a proxy cluster implemented either within or across data centers/clouds For the purposes of the invention, including the embodiment illustrated in FIG. 8, the API/application traffic data may additionally be collected from various sources including but not limited to a Layer 7 proxy, Layer 2 or Layer 3 switches, SDN (Software Defined Networking) TAP ports, TAP aggregator groups, third-party logs from load balancers or API servers, network sensors and agents, network appliances, etc.

It would be understood that embodiments of the invention support various API types including but not limited to REST API for HTTP/CoAP, WebSocket API, MQTT API, AMQP, etc. The API/application traffic data may be captured in either text or in various binary formats such as array buffer, blob, etc., or for that matter any other format. Traffic data may thereafter be passed to machine learning servers for processing using various techniques including data streaming.

In an embodiment of the invention, machine learning servers may be used to analyze the data using histograms and or mixture models which may be multi-dimensional, unidimensional, bidirectional, tridimensional and so on, for several dimensions. In a further embodiment of the invention, the histograms and mixture models are selected to support one or more APIs traffic from one or more sources across a time range. Contextual analysis of API traffic thereafter enables differentiation between normal traffic and abnormal traffic and/or attacks on an API.

Figure 9:
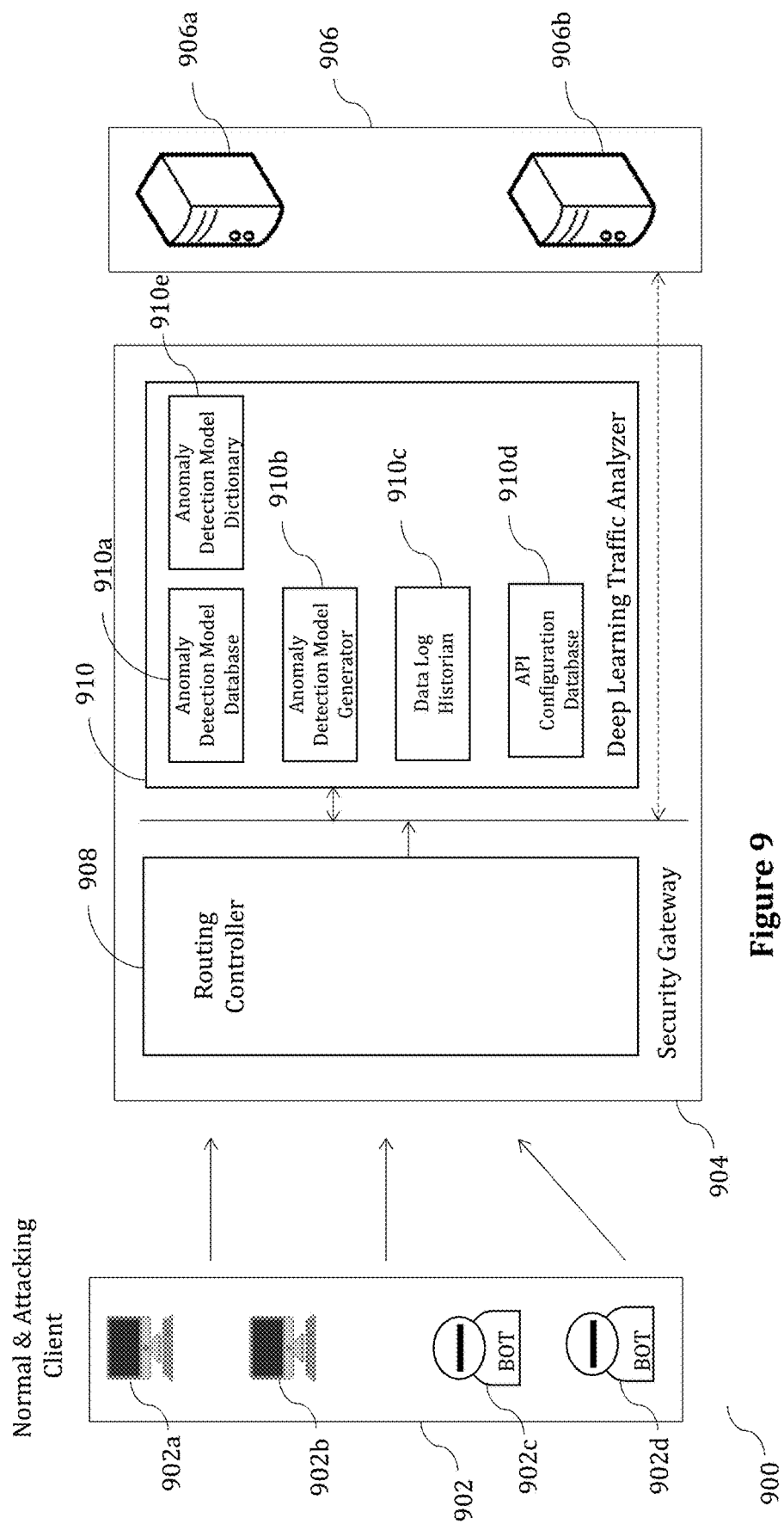
FIG. 9 illustrates specific features of a security gateway/network proxy configured to implement deep learning based API traffic security.

In preferred embodiments of the invention, the API security related embodiments of the invention may be understood to include, for single dimensional models, one or more of:

Histogram based models, that may be specific to each API
IP address/cookie specific features for each API—wherein the IP address is information that can be used to identify the source of the traffic
Feature specific models with equal or unequal bin widths
Feature transformation with fine grained resolution in lower bins
Laplace smoothing to allow only non-zero probabilities
Density based anomaly score computation
Continuous model training with a decay factor In preferred embodiments, the API security related embodiments of the invention may be understood to include, for multi-dimensional models, one or more of:

IP address/cookie/token/API key specific features for each API—wherein the IP address/cookie/token/API key is information that can be used to identify the source of the traffic
Correlation of traffic corresponding to multiple IPs/cookies/tokens/API keys to identify a single attacker or the source of an attack
Spatial and temporal features
Context specific models
Feature transformation across multiple time windows
Clustering based feature grouping and feature selection
Multi-dimensional Gaussian mixture models FIG. 9 illustrates an embodiment of a system configured to implement the methods of any one or more of FIGS. 3, 4 and 7.

FIG. 9 illustrates an exemplary system 900 in accordance with teachings of the present invention, comprising security gateway 904 disposed as a network intermediate between one or more instances of client(s) 902 (comprising exemplary client terminal devices 902a and 902b and bots 902c and 902d) and a server backend 906 comprising a plurality of servers 906a and 906b. Security gateway 904 comprises routing controller 908 and deep learning Traffic Analyzer 910. Deep learning traffic analyzer 910 in turn includes anomaly detection model database 910a, anomaly detection model generator 910b, data log historian 910c, API configuration database 910d and anomaly detection model dictionary/repository 910e.

In the illustrated embodiment, anomaly detection model generator 910b is configured to generate anomaly detection models in accordance with any one of the teachings of FIGS. 3,4 or 7, including based on one or more of data logs extracted from data log historian 910c, API configurations extracted from API configuration database 910d and anomaly detection model dictionary/database 910e. Anomaly detection model database 910a may be configured for retrievable storage of anomaly detection models generated by anomaly detection model generator 910b. Data log historian 910c may comprise a database configured to store data logs relating to data messages and communication to and from APIs or API servers implemented within server backend 906. API configuration database 910d may be configured API configurations for one or more APIs and additionally to store an association between each API configuration and a corresponding API.

In addition to generating anomaly detection models, deep learning analyzer 910 may be configured to analyze API traffic and to detect deviations between actual API traffic and establish traffic parameter baselines corresponding to a particular API—for the purposes of determining whether a detected traffic event is a legitimate or normal communication, or alternatively whether the detected traffic event is representative of an anomaly/attack/threat/indicator of compromise.

In an embodiment of the invention, routing controller 908 may be configured to route API/application traffic to deep learning traffic analyzer 910 for determination whether communications/messages/traffic events received or detected at routing controller 908 are representative of an anomaly/attack/threat/indicator of compromise. Either of routing controller 908 or deep learning traffic analyzer 910 may be configured to discard or reject transmission of communications/messages/traffic events that have been determined to be representative of an anomaly/attack/threat/indicator of compromise, and only to allow transmission of communications/messages/traffic events that are found to be consistent with (or within established traffic parameter baselines for) normal traffic patterns associated with an API or application.

FIG. 10 illustrates an exemplary computer system 1002 for implementing the present invention.

The computer system 1002 comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A network gateway configured for securing a plurality of Application Programming Interfaces (APIs) implemented on a plurality of servers, the network gateway comprising:
    a processor configured to:
        receive a call to a first API from the plurality of APIs and implemented on a first server from the plurality of servers, the first API being associated with an API class;
        receive a call to a second API from the plurality of APIs and implemented on a second server from the plurality of servers and different from the first server, the second API being associated with the API class;
        generate an anomaly detection model for the API class based on parameter data extracted from the call to the first API and parameter data extracted from the call to the second API, wherein:
            selection of parameter data for generating the anomaly detection model for the API class is based on API configuration information corresponding to the first API and API configuration information corresponding to the second API; and
            the generated anomaly detection model includes one or more traffic parameter baseline values defined based on traffic parameter data corresponding to network traffic that is compliant with a prescribed network security policy;
        analyze traffic parameter data corresponding to a data packet directed to the first API for identifying deviations between the analyzed traffic parameter data and the one or more traffic parameter baseline values included within the generated anomaly detection model; and
        route the data packet to the first server based on an output of said analysis of traffic parameter data and based on identifying the data packet as being associated with the first API.

2. The network gateway as claimed in claim 1, wherein responsive to identifying a deviation between the analyzed traffic parameter data and the one or more traffic parameter baseline values, discarding a client message directed to the first API without forwarding said client message to said first API.

3. The network gateway as claimed in claim 1, wherein the anomaly detection model is a first anomaly detection model, the processor is further configured to:
    receive a call to a third API from the plurality of APIs;
    generate a second anomaly detection model based on parameter data extracted from the call to the third API, wherein:

selection of parameter data for generating the second anomaly detection model is based on API configuration information corresponding to the third API, said API configuration information corresponding to the third API is different from the API configuration information corresponding to the first API;

the generated second anomaly detection model includes one or more traffic parameter baseline values defined based on traffic parameter data corresponding to network traffic that is compliant with a prescribed network security policy; and at least one traffic parameter baseline value based on traffic parameter data included within the second anomaly detection model is different from at least one corresponding traffic parameter baseline value based on traffic parameter data included within the first anomaly detection model.

4. The network gateway as claimed in claim 3, wherein the processor is configured to respond to an event trigger for identifying an event state associated with an API selected from among the first API and the third API, and wherein identifying said event state comprises:

identifying one or more deviations between data extracted from traffic data corresponding to the selected API and one or more traffic parameter baseline values defined by an anomaly detection model corresponding to the selected API; and selecting an event state from a plurality of event states, based on the identified one or more deviations.

5. The network gateway as claimed in claim 1, wherein the anomaly detection model is one of a single dimensional model or a multi-dimensional model.

6. The network gateway as claimed in claim 1, wherein the anomaly detection model is generated based on at least one of one or more histogram techniques, one or more mixture models, or one or more Gaussian models.

7. The network gateway as claimed in claim 4, wherein the second anomaly detection model is one of a single dimensional model or a multi-dimensional model.

8. The network gateway as claimed in claim 4, wherein the second anomaly detection model is generated based on at least one of one or more histogram techniques, one or more mixture models, or one or more Gaussian models.

9. The network gateway as claimed in claim 1, wherein:

analysis of traffic parameter data corresponding to network traffic directed to the first API or the second API comprises identifying deviations between the analyzed traffic parameter data and the one or more traffic parameter baseline values included within the anomaly detection model.

10. A network gateway configured for securing a plurality of Application Programming Interfaces (APIs) implemented on a plurality of servers, the network gateway comprising:

a processor configured to:

receive an event trigger for generation of a first anomaly detection model corresponding to an API class associated with a first API from the plurality of APIs and a second API from the plurality of APIs, the first API implemented on a first server from the plurality of servers and the second API implemented on a second server from the plurality of servers;

identify one or more API parameters corresponding to the first API and one or more API parameters corresponding to the second API;

parse an anomaly detection model database to identify a second anomaly detection model having API parameters that match the one or more API parameters corresponding to the first API and the one or more API parameters corresponding to the second API;

responsive to identifying the second anomaly detection model, generate the first anomaly detection model based on the identified second anomaly detection model; and route a data packet to the first server based on an analysis of the data packet with respect to the first anomaly detection model and based on identifying the data packet as being associated with the first API.

11. The network gateway as claimed in claim 10, wherein the API parameters include at least one of API type, API function, API class or API category.

12. A method for securing one or more Application Programming Interfaces (APIs) implemented on a plurality of servers, the method comprising:

receiving a call to a first API from the plurality of APIs and implemented on a first server from the plurality of servers, the first API being associated with an API class;

receiving a call to a second API from the plurality of APIs and implemented on a second server from the plurality of servers and different from the first server, the second API being associated with the API class;

generating an anomaly detection model for the API class based on parameter data extracted from the call to the first API and parameter data extracted from the call to the second API, wherein:

selection of parameter data for generating the anomaly detection model for the API class is based on API configuration information corresponding to the first API and API configuration information corresponding to the second API; and the generated anomaly detection model includes one or more traffic parameter baseline values defined based on traffic parameter data corresponding to network traffic that is compliant with a prescribed network security policy;

analyzing traffic parameter data corresponding to a data packet directed to the first API for identifying deviations between the analyzed traffic parameter data and the one or more traffic parameter baseline values included within the generated first anomaly detection model; and route the data packet to the first server based on an output of said analysis of traffic parameter data and based on identifying the data packet as being associated with the first API.

13. The method as claimed in claim 12, wherein responsive to identifying a deviation between the analyzed traffic parameter data and the one or more traffic parameter baseline values, discarding a client message directed to the first API without forwarding said client message to said first API.

14. The method as claimed in claim 12, wherein the anomaly detection model is a first anomaly detection model, the method further comprising the steps of:

receiving a call to a third API from the plurality of APIs; and generating a second anomaly detection model based on parameter data extracted from the call to the third API, wherein:

selection of parameter data for generating the second anomaly detection model is based on API configuration information corresponding to the third API, said API configuration information corresponding to the third API is different from the API configuration information corresponding to the first API;

the generated second anomaly detection model includes one or more traffic parameter baseline values defined based on traffic parameter data corresponding to network traffic that is compliant with a prescribed network security policy; and at least one traffic parameter baseline value based on traffic parameter data included within the second anomaly detection model is different from at least one corresponding traffic parameter baseline value based on traffic parameter data included within the first anomaly detection model.

15. The method as claimed in claim 14, further comprising responding to an event trigger for identifying an event state associated with an API selected from among the first API and the third API, and wherein identifying said event state comprises:

identifying one or more deviations between data extracted from traffic data corresponding to the selected API and one or more traffic parameter baseline values defined by an anomaly detection model corresponding to the selected API; and selecting an event state from a plurality of event states, based on the identified one or more deviations.

16. The method as claimed in claim 12, wherein the anomaly detection model is one of a single dimensional model or a multi-dimensional model.

17. The method as claimed in claim 12, wherein the anomaly detection model is generated based on at least one of one or more histogram techniques, one or more mixture models, or one or more Gaussian models.

18. The method as claimed in claim 14, wherein the second anomaly detection model is one of a single dimensional model or a multi-dimensional model.

19. The method as claimed in claim 14, wherein the second anomaly detection model is generated based on at least one of one or more histogram techniques, one or more mixture models, or one or more Gaussian models.

20. The method as claimed in claim 12, wherein:

analysis of traffic parameter data corresponding to network traffic directed to the first API or the second API comprises identifying deviations between the analyzed traffic parameter data and the one or more traffic parameter baseline values included within the anomaly detection model.

21. A method for securing a plurality of Application Programming Interfaces (APIs) implemented on a plurality of servers, the method comprising:

receiving an event trigger for generation of a first anomaly detection model corresponding to an API class associated with a first API from the plurality of APIs and a second API from the plurality of APIs, the first API implemented on a first server from the plurality of servers and the second API implemented on a second server from the plurality of servers;

identifying one or more API parameters corresponding to the first API and one or more API parameters corresponding to the second API;

parsing an anomaly detection model database to identify a second anomaly detection model having API parameters that match the one or more API parameters corresponding to the first API and the one or more API parameters corresponding to the second API;

responsive to identifying the second anomaly detection model, generating the first anomaly detection model based on the identified second anomaly detection model; and routing a data packet to the first server based on an analysis of the data packet with respect to the first anomaly detection model and based on identifying the data packet as being associated with the first API.

22. The method as claimed in claim 21, wherein the API parameters include at least one of API type, API function, API class or API category.

23. A computer program product for securing a plurality of Application Programming Interfaces (APIs) implemented on a plurality of servers, comprising a non-transitory computer readable medium having a computer readable program code embodiment therein, the computer readable program code comprising instructions for:

receiving a call to a first API from the plurality of APIs and implemented on a first server from the plurality of servers, the first API being associated with an API class;

receiving a call to a second API from the plurality of APIs and implemented on a second server from the plurality of servers and different from the first server, the second API being associated with the API class;

generating an anomaly detection model for the API class based on parameter data extracted from the call to the first API and parameter data extracted from the call to the second API, wherein:

selection of parameter data for generating the anomaly detection model for the API class is based on API configuration information corresponding to the first API and API configuration information corresponding to the second API; and the generated anomaly detection model includes one or more traffic parameter baseline values defined based on traffic parameter data corresponding to network traffic that is compliant with a prescribed network security policy;

analyzing traffic parameter data corresponding to a data packet directed to the first API for identifying deviations between the analyzed traffic parameter data and the one or more traffic parameter baseline values include within the generated first anomaly detection model; and routing the data packet to the first server based on an output of said analysis of traffic parameter data and based on identifying the data packet as being associated with the first API.

24. A computer program product for securing a plurality of Application Programming Interfaces (APIs) implemented on a plurality of servers, comprising a non-transitory computer readable medium having a computer readable program code embodiment therein, the computer readable program code comprising instructions for:

receiving an event trigger for generation of a first anomaly detection model corresponding to an API class associated with a first API from the plurality of APIs and a second API from the plurality of APIs, the first API implemented on a first server from the plurality of servers and the second API implemented on a second server from the plurality of servers;

identifying one or more API parameters corresponding to the first API and one or more API parameters corresponding to the second API;

parsing an anomaly detection model database to identify a second anomaly detection model having API parameters that match the one or more API parameters corresponding to the first API and the one or more API parameters corresponding to the second API;

responsive to identifying the second anomaly detection model generating the first anomaly detection model based on the identified second anomaly detection model; and routing a data packet to the first server based on an analysis of the data packet with respect to the first anomaly detection model and based on identifying the data packet as being associated with the first API.

* * * * *